No. 751,883. PATENTED FEB. 9, 1904.
H. B. WALBRIDGE.
RAILWAY SYSTEM.
APPLICATION FILED OCT. 20, 1903.
NO MODEL.
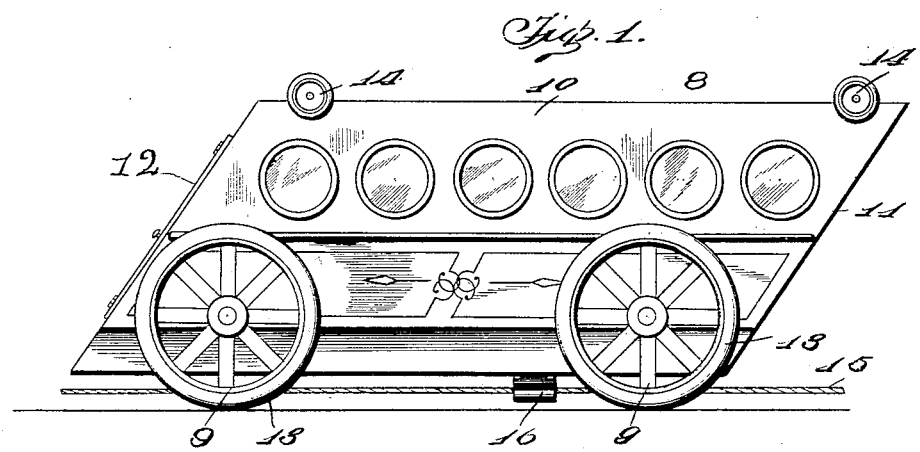
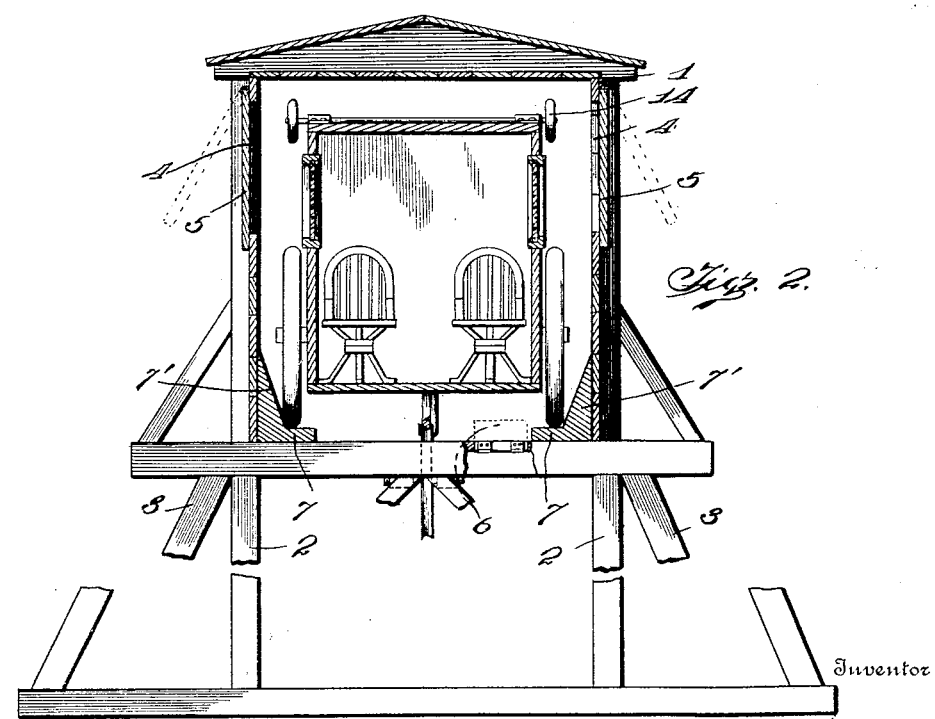
Witnesses
Inventor
Henry B. Walbridge No. 751,883. Patented February 9, 1904.

UNITED STATES PATENT OFFICE.

HENRY B. WALBRIDGE, OF WASHINGTON, DISTRICT OF COLUMBIA.

RAILWAY SYSTEM.

SPECIFICATION forming part of Letters Patent No. 751,883, dated February 9, 1904.

Application filed October 20, 1903. Serial No. 177,766. (No model.)

*To all whom it may concern:*

Be it known that I, HENRY B. WALBRIDGE, a citizen of the United States, residing at Washington, in the District of Columbia, have invented certain new and useful Improvements in Railway Systems; and I do hereby declare the following to be a full, clear, and exact description of the invention, such as will enable others skilled in the art to which it appertains to make and use the same.

This invention relates to improvements in railways, and particularly to means for facilitating rapid transit.

The object in view is the provision of means for permitting excessively high speed of vehicles, while obviating the danger of injury thereby.

With this and other objects in view the invention consists in the combination of an inclosing housing, means for permitting the escape of air therefrom, means of admitting air to said housing, a vehicle within the same, and means for propelling said vehicle.

It further consists, in combination with a conduit or housing, of a vehicle within the same formed with an inclined forward end and means for propelling said vehicle.

It also consists in certain other constructions, arrangements, and combinations of parts, as will be hereinafter fully described and claimed.

In the accompanying drawings, Figure 1 represents a view in side elevation of my preferred form of improved vehicle. Fig. 2 represents a transverse vertical section taken through the housing and vehicle embodying the features of the present invention.

It is well known that when the ordinary vehicles are driven at an excessive speed the injury to the parts is usually quite extensive, particularly through excessive friction; but I contemplate avoiding the resulting friction due to a rotation of the supporting-wheels by the present improved structure, which, as illustrated in the accompanying drawings, consists of a vehicle conduit or housing 1, preferably lifted or supported upon suitable standards 2 2 and stays 3 3 of any preferred and well-known type and arrangement. At suitable intervals within the walls of the housing 1 are formed doorways 4 4, normally closed by doors 5 5, hinged outside the said housing and in operation constituting check-valves opening under pressure from within and closed by pressure from without. The doors 5 are preferably hinged at their upper edges, so that after being lifted by pressure from within the same may drop to a closed position by gravity as soon as such pressure is removed.

In the bottom or at any other preferred points in the housing 1 are arranged doors 6, which are hinged and operate as check-valves conversely to the operation of the doors 5, whereby said doors 6 will be lifted inwardly by suction within or pressure from without and will be permitted to drop to a closed position as soon as such pressure is released.

At each side of the base of housing 1 is arranged a rail 7, constructed, preferably, of wood and designed to support a vehicle 8 by its carrier-wheels 9 9, which normally rest upon said rails. The vehicle 8 may be of any type; but, as seen in the drawings, I prefer a construction involving a body portion 10, formed with an inclined forward end 11, beveled downwardly and rearwardly for directing the atmosphere contacting with such forward end beneath the body portion. The rear end of the body portion 10 may be provided with any suitable door 12 for permitting the entrance of passengers, and the interior of the vehicle may be finished as desired. The wheels 9 carry any common and well-known type of axles engaging the body portion 10 for supporting the vehicle, and each of said wheels is preferably provided with a cushion or solid rubber tire 13, adapted in operation to ride upon the rails 7, said rails being of soft material for assisting in cushioning the movement of the vehicle 8.

Mounted on top and near each end of the vehicle 8 are suitable antifriction-bearings 14 14, designed in operation to prevent the top of said vehicle from striking against the roof of housing 1 when the vehicle is lifted with sufficient velocity for causing the same to lift its wheels from the rails 7 under the pressure of atmosphere passing beneath the body portion 10.

The vehicle 8 may be an automobile; but, as illustrated, I prefer to employ a cable 15, engaged by a grip 16 of common construction controlled and operated from within the vehicle, the operating means not being illustrated.

I contemplate in operation constructing the housing 1 of any desired length, extending from one point to another and arranging the cable 15 in sections or relays. When it is desired to start the vehicle 8, the grip 16 is caused to engage the first section of cable 15, which when practical I contemplate having retained in a stationary condition until such time as it is desired to start the vehicle or car, so that the starting of the car and the starting of the cable may be simultaneous, the car being thus started without jarring or sudden forward motion. After the car has gained considerable velocity it passes the first relay, releasing the grip 16 while moving from one section of the cable to the other and grasping the second section of cable as soon as in proper position for such operation. Of course the second section of cable is caused to travel at a speed equal to or greater than the speed of the first section, the momentum of the car preventing any jarring upon engagement of the second section of cable by the grip 16. When it is found necessary to extend the housing 4 about a curve, I contemplate ending one section of the cable at one end of the curve and commencing the next succeeding section at the other end of said curve, depending in operation upon the momentum of the car for carrying the same about the curve.

Of course the vehicle 8 may be driven at any speed desired; but in accomplishing the object of the present invention I contemplate moving the car at such speed as to cause the beveled forward end 11 to direct the atmosphere within the housing 1 beneath the body 10 with such velocity as to lift the said body, and thus obviate the danger of frictional contact between the hubs of wheels 9 and their axles. Should the movement of the car become so accelerated as to endanger contact of the upper surface thereof with the roof of the housing 1, the antifriction-rollers 14 will prevent such contact and obviate danger of injury to the car. Of course the enormous pressure of the rapidly-moving vehicle will cause a certain amount of compression of atmosphere within the housing 1 in front of the car, which compression I release by the lifting of doors 5, and a certain amount of suction will necessarily occur in the rear of the vehicle, which will lift the doors 6 for admitting atmosphere and releasing such suction.

It will be observed that I have provided inclined ways 7' 7', leading from the side walls of the housing 1 to the horizontal surface of the rails 7. The ways 7' may be formed integral with their respective rails 7, as illustrated, or may be made separate thereform and secured thereto, as preferred. The advantage of the ways 7' will be obvious in that they guide the wheels 9 to their proper position upon the rails 7 when the vehicle 8 is descending, owing to a decrease in its speed, after having been lifted through excessive velocity.

Having thus fully described my invention, what I claim as new, and desire to secure by Letters Patent, is—

1. In a railway system, the combination of a housing and air-admission means in the floor thereof.

2. In a railway system, the combination with a housing, means for releasing pressure from within the housing, and doors hinged to the bottom thereof and free to swing inwardly.

3. In a railway system, the combination with a housing, of cushion-rails arranged therein, a vehicle within said housing, rubber-tired wheels carrying said vehicle and supported on said rails, and means for propelling said vehicle.

4. In a railway system, the combination with a housing of wooden rails arranged therein, a vehicle within said housing, cushion-tired wheels supporting said vehicle and engaging said wooden rails, and means for propelling said vehicle.

5. In a railway system, the combination with a housing, of rails arranged at each side of the bottom thereof, and inclined guideways extending from the side walls of the housing to the respective rails.

6. In a railway system, the combination with an inclosing housing, of a vehicle within the same formed with a downwardly and rearwardly inclined front end, and means for propelling said vehicle.

In testimony whereof I hereunto affix my signature in presence of two witnesses.

HENRY B. WALBRIDGE.

Witnesses:
 E. T. FENWICK,
 JOHN L. FLETCHER.